United States Patent [19]

Carpenter et al.

[11] 3,753,123

[45] Aug. 14, 1973

[54] SIGNAL SORTING SYSTEM

[75] Inventors: Daniel D. Carpenter, Manhattan Beach; Jean A. Develet, Jr., Palos Verdes Peninsula; Robert Y. Huang, Palos Verdes, all of Calif.

[73] Assignee: T. R. W. Inc., Redondo Beach, Calif.

[22] Filed: Oct. 16, 1970

[21] Appl. No.: 81,194

[52] U.S. Cl. .................................. 325/476, 325/479
[51] Int. Cl. .................................... H04b 1/16
[58] Field of Search .................. 325/41, 42, 45, 65, 325/341, 344, 345, 346, 419, 420, 421, 473, 474, 475, 476, 377, 378, 384, 478, 479, 47; 330/109

[56] References Cited

UNITED STATES PATENTS

| | | | |
|---|---|---|---|
| 3,435,344 | 3/1969 | Blair | 325/421 |
| 3,596,150 | 7/1971 | Michishita | 325/476 X |
| 3,611,165 | 10/1971 | Hills | 330/109 X |
| 2,386,528 | 10/1945 | Wilmotte | 325/344 |
| 3,177,489 | 4/1965 | Saltzberg | 325/476 X |
| 3,213,450 | 10/1965 | Goor | 325/475 X |

*Primary Examiner*—Benedict V. Safourek
*Attorney*—Daniel T. Anderson, Alfons Valukonis and Harry I. Jacobs

[57] ABSTRACT

A signal sorting system having a signal summer for vectorially subtracting from input signals estimate signals of the input signals to provide error signals at its output, and a plurality of signal extractors connected to the signal summer and responsive to the error signals for providing the estimate signals.

28 Claims, 4 Drawing Figures

Daniel D. Carpenter
Jean A. Develet
Robert Y. Huang
INVENTORS

BY

Alfons Valukonis

AGENT

Daniel D. Carpenter
Jean A. Develet
Robert Y. Huang
INVENTORS

BY
Alfons Valukonis
AGENT

Daniel D. Carpenter
Jean A. Develet
Robert Y. Huang
INVENTORS

BY

Alfons Valukonis
AGENT

SIGNAL SORTING SYSTEM

BACKGROUND OF THE INVENTION

1. Field of the Invention

This invention relates generally to signal sorting systems, and more particularly to a system that sorts frequency modulation, television, and radar signals.

2. Description of the Prior Art

It is often desired to demodulate a signal in the presence of man-made interference. This situation occurs when use of frequency assignments are nonmutually exclusive, as can happen when there are more users than supportable by the bandwidth allocation. Another case of interest is when, due to anomalous propagation modes, two or more communication links mutually interfere which normally do not do so. A third case of interest is in the reception of signals on a space craft or high altitude airplane, which sees areas of the earth which are normally shielded from each other by the earth's curvature. Three forms of man-made interference occur most often for frequencies higher than 30 Mhz. These are: commercial FM stations, commercial TV stations, and radars.

There are conventional ways of reducing the effect of these interferers on a desired signal. They consist essentially of time and frequency gate circuits, which do not allow any signals to pass through their operating regions. While these prior art devices are effective in rejecting undersired signals, at the same time they distort the desired signal very badly, either by gating out certain segments of the desired signals, or by rejecting certain frequency components in the desired signal.

The present invention avoids the drastic distortion of the desired signal by subtracting out the interference, rather than using time and frequency gating. Accordingly, the device of the present invention can demodulate a signal in the presence of these and other forms of man-made interference with great fidelity.

SUMMARY OF THE INVENTION

A signal sorting system having input and output signal terminals. Signal summing means is provided which is connected to the input and output terminals for subtracting from input signals applied to the input terminal estimate signals to provide error signals at the output terminal. Also provided is signal extractor means connected to the signal summing means and the output terminal and responsive to error signals for providing the estimate signals.

DESCRIPTION OF THE PREFERRED EMBODIMENT

Figure 1:
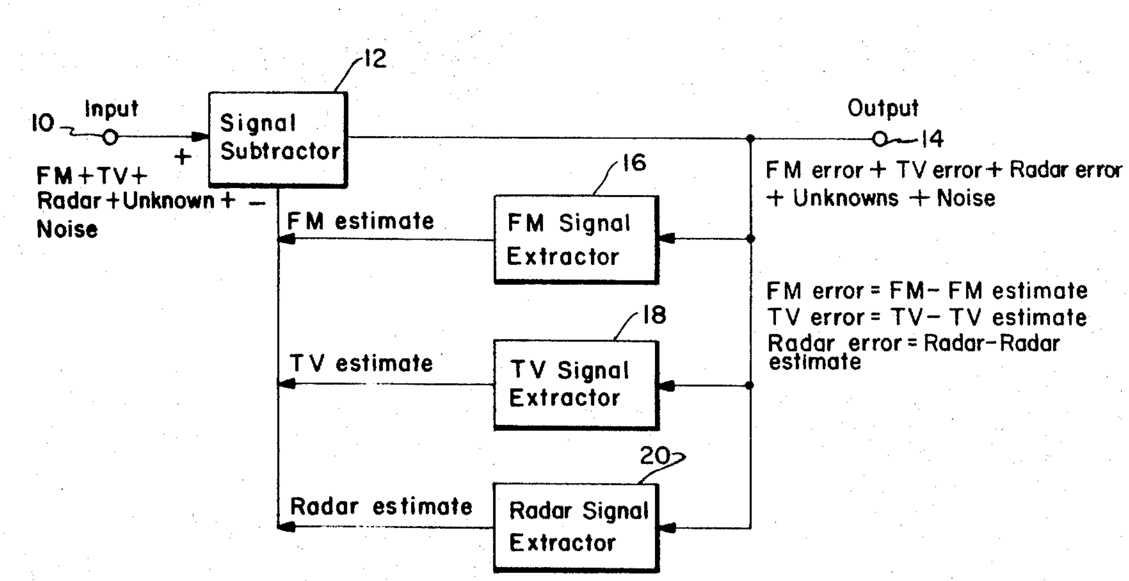
FIG. 1 is a block diagram showing of the sorting system of the present invention capable of sorting frequency modulation, television, and radar signals.

Referring to FIG. 1 wherein there is shown the signal sorting system of the present invention, the numeral 10 designates an input signal terminal to which there is adapted to be applied, for example, frequency modulation, television, radar, unknown, and noise signals. A signal subtractor 12, which could be a summing amplifier, has its input connected to the input terminal 10 and its output connected to an output terminal 14. The signal subtractor 12 subtracts generated estimate signals of the input signals from the input signals to provide error signals at the output terminal 14. A plurality of signal extractors, designated by the numerals 16, 18, and 20, respectively, have their inputs connected to the output terminal 14 and their outputs connected to the other input of the signal subtractor 12. Each of the extractors 16, 18, and 20 responds maximally to one of the error signals from the subtractor 12 to produce in its output an estimate of that input signal.

Thus, briefly, in operation, the signal extractor 16 responds to the frequency modulation error signal and produces in its output an estimate signal which includes any incidental amplitude variations of the frequency modulation carrier signal, caused, for example, by propagation anomalies. The estimate signal is inverted and fed out of phase into the signal subtractor 12 to vectorially subtract from the frequency modulation input signal. Similarly, the extractors 18 and 20 produce estimate signals of the television and radar signals applied at the input terminal 10 in their respective outputs, which are also fed out of phase into the signal subtractor 10 wherein they are subtracted from the input television and radar signals, respectively. The frequency modulation, television, and radar error signals, which result after subtraction at the signal subtractor 10, appear at the output terminal 14 along with the noise and unknown signals. Since the frequency modulation, television, and radar estimate signals are subtracted vectorially in the subtractor 10 from the frequency modulation, television, and radar input signals, respectively, the effect of removing, for example, the frequency modulation signal from the total input has no appreciable effect on the remaining television and radar signals. Where input signals are unlike, for example, television and frequency modulation signals, complete spectral overlap can occur, and each extractor will remain locked on its own signal. Such vector subtraction provides a minimum distortion of the other input signals, for example, the unknown signals, and aids in their processing, when desired.

Figure 2:
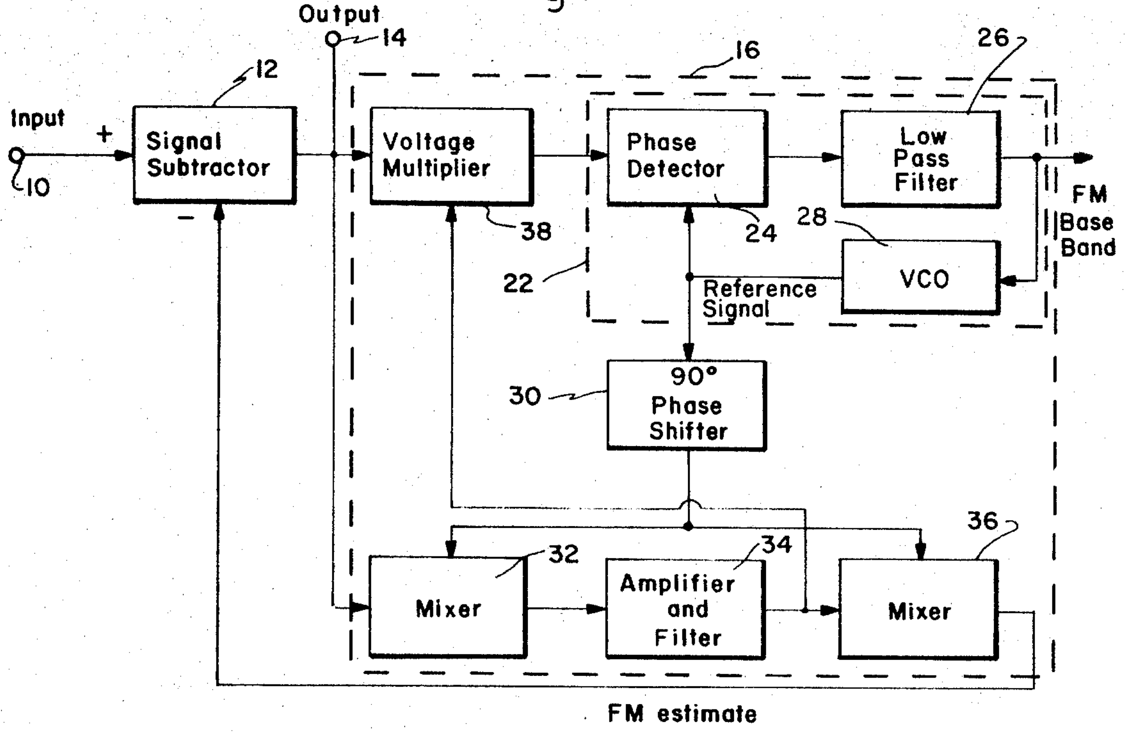
FIG. 2 is a block diagram showing of the details of the frequency modulation signal extractor of FIG. 1.

Referring to FIG. 2, wherein the frequency modulation extractor 16 is shown in greater detail, the numeral 22 designates a phase lock loop consisting of a phase detector 24, a low pass filter 26, and a VCO 28. The phase of the frequency modulation error signal carrier is compared with the phase of a reference signal generated by the VCO 28 in the phase detector 24. The resultant phase difference signal generated by the detector 24 is passed through the low pass filter 26 to minimize the tracking error while rejecting noise, and is then applied to adjust the VCO 28 and change the frequency of the reference signal accordingly. The output reference signal of the VCO 28 is shifted 90° by a phase shifter 30 and is applied as one of the input signals to a mixer 32. The other input signal to the mixer 32 is supplied from the output terminal 14. Thus, the output signal from the mixer 32 is the amplitude component of the frequency modulation error signal which is applied to the amplifier and filter 34 selected to pass the expected amplitude spectrum while rejecting amplitude variations caused by noise outside the spectrum. The output signal from the phase shifter 30 is also applied as one of the inputs to a mixer 36 wherein it is modulated by the amplitude component signal from the amplifier and filter 34. Thus, the output signal of the mixer 36 is a signal which is an estimate of the input frequency modulation signal, in phase therewith, and having the same amplitude component, with the noise signals removed. This frequency modulation estimate signal is the reconstructed signal which is inverted and applied to the subtactor 12. The output signal from the amplifier and filter 34 is also supplied to a voltage multiplier 38 which interconnects the subtractor 12 and phase detector 24. The multiplier 38 serves to vary the instantaneous gain of the phase lock loop 22. It is to be noted that instead of an automatic gain control effect, which would tend to keep the gain of loop 22 constant, the multiplier 38 serves instead to vary the loop gain proportional to the power of the error signals from the subtractor 12. This is desirable since for a predetermined magnitude of error signals, the estimation fidelity needs to increase as the signal power increases, thus requiring an increased gain for loop 22.

Figure 3:
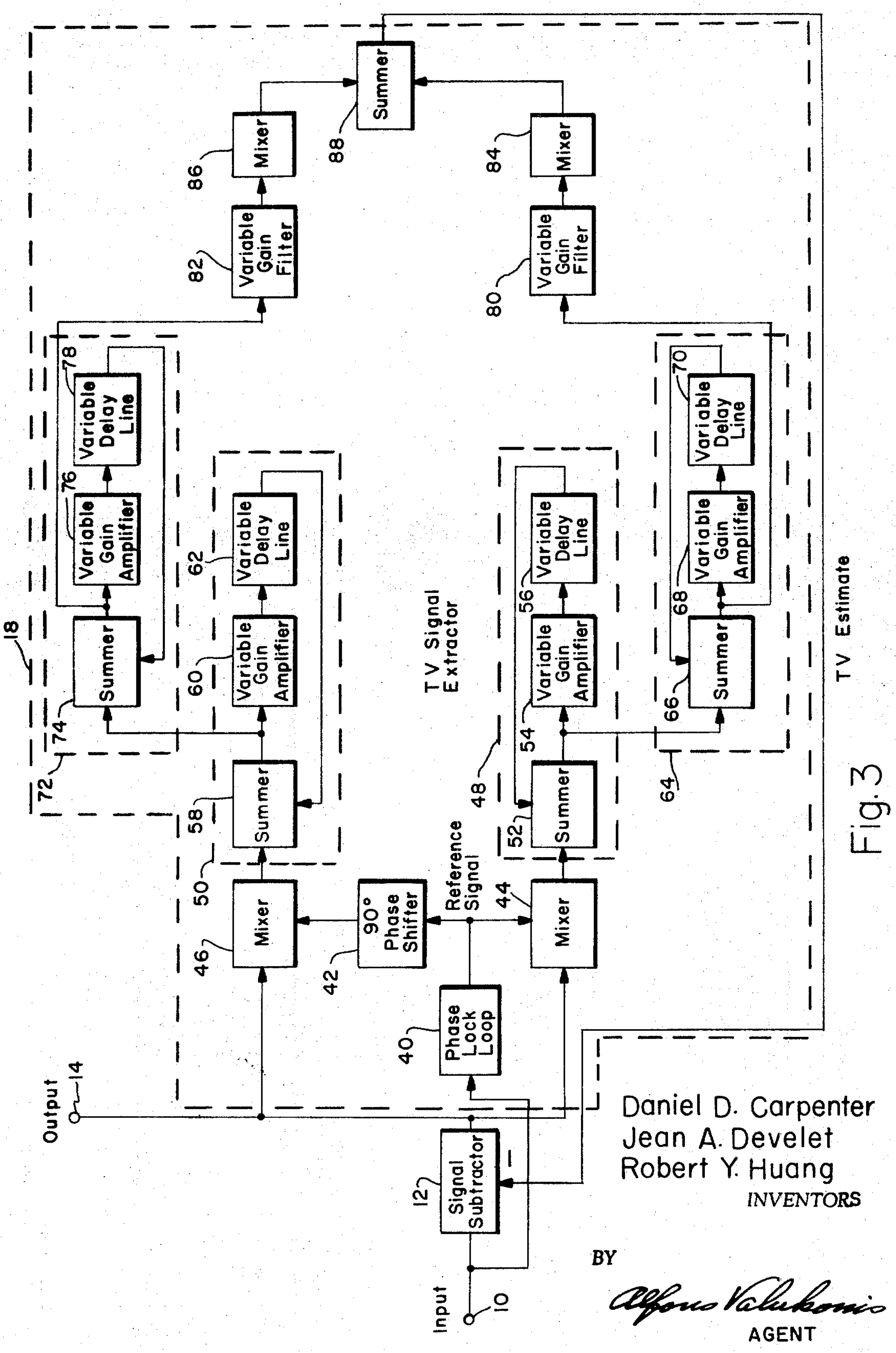
FIG. 3 is a block diagram showing of the details of the television signal extractor of FIG. 1.

Referring to FIG. 3, wherein the television extractor 18 is shown in greater detail, the numeral 40 designates a narrow band phase lock loop having its input connected to the input terminal 10 and its output to a phase shifter 42 and one input of a mixer 44. The output of the phase shifter 42 is connected to one of the inputs of a mixer 46. The other inputs of the mixers 44 and 46 are connected to the output of a signal subtractor 12.

The phase lock loop 40 is conventional and can consist of such well known components as a phase detector, low pass filter, and a reference oscillator, all not shown, whereby the input television signal carrier follows exactly the phase of a reference signal generated by the reference oscillator by comparing the phases between these two signals and using the resultant difference signal to adjust the reference oscillator and change the frequency of the reference signal accordingly. The reference signal is supplied to the mixer 44 wherein demodulation of the television error signal, also supplied to the mixer 44 from the subtractor 12, takes place to baseband yielding an in-phase component of the television signal in the output of the mixer 44. Similarly, the reference signal is supplied to the phase shifter 42 where it is shifted in phase by 90° and then is applied as one of the inputs to the mixer 46 wherein demodulation to baseband of the television error signal applied as the other input to the mixer 46 takes place, to yield the quadrature component of the frequency band occupied by all of the signals which modulate the television carrier signal. Next, the in-phase and quadrature components of the television signal are supplied to similar comb filters 48 and 50, respectively.

The filter 48 is matched to the television signal line rate and consists of a summer 52, a variable gain amplifier 54, and a variable delay line 56. The summer 52 accepts the in-phase component of the television signal as well as the output of the variable delay line 56 and feeds its output through the variable gain amplifier 54 to the variable delay line 56.

The filter 50 consists of similar components, a summer 58, a variable gain amplifier 60, and a variable delay line 62, all similarly arranged, but with the summer 58 accepting the quadrature component of the television signal from the mixer 46. The filter 50 is also matched to the line rate of the television signal.

The output from the summer 52 is also fed to a weighting filter 64 which is matched to the intraline correlation (signal bandwidth) of the television signal, and consists of a summer 66, a variable gain amplifier 68, and a variable delay line 70. Similarly, the output of summer 58 is applied to another weighting filter 72, also matched to the intraline correlation of the television signal, and which consists of similarly arranged components, a summer 74, a variable gain amplifier 26, and a variable delay line 78.

The output from the summer 66 is also applied to a variable gain filter 80. Similarly, the output from the summer 74 is fed to another variable gain filter 82. The filters 80 and 82 are provided so as to terminate the frequency response of the television extractor 18 above some predetermined high frequency, for example, as in one application, at $4MH_z$ for out of band signal rejection.

It will be appreciated that for extraction of a particular television signal the filter bandwidth and structure may be optimized by adjusting the gains of amplifiers 54, 60, 68, and 76 and the gains of the filters 80 and 82, as well as the time delays of the delay lines 56, 62, 70, and 78.

Single sideband up conversion to the orginal television signal carrier frequency is accomplished in the in-phase channel by feeding the output of the filter 80 to a mixer 84 to which there is also applied the reference signal from the narrow band phase lock loop 40. Likewise the quadrature component of the signal is applied to a mixer 86 wherein it modulates the 90° phase shifted reference signal from the phase shifter 42.

The outputs from the mixers 84 and 86 are directed to a summer 88, and combined therein to produce the recreated estimate of the television signal, which is then utilized to subtract from the input television signal in the subtractor 12.

Figure 4:
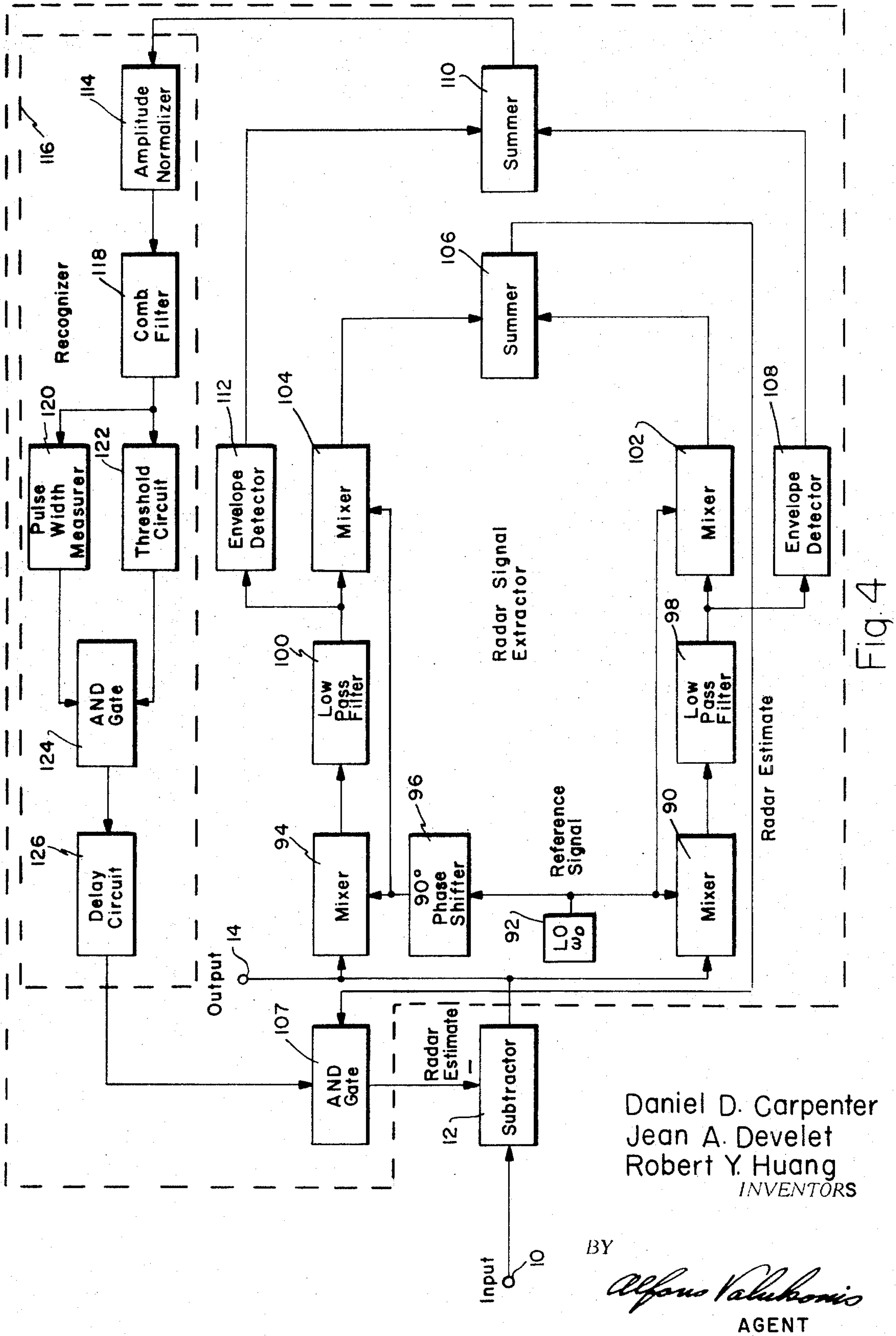
FIG. 4 is a block diagram showing of the details of the radar signal extractor of FIG. 1.

Referring to FIG. 4 wherein there is shown the details of the radar signal extractor 20 which optimally estimates and extracts radar pulses of a predetermined pulse width, frequency, and pulse repetition interval (PRI). The error signal from the subtractor 12 is applied to a mixer 90 wherein it is converted to in-phase baseband by the application of a signal of frequency $\omega_o$ from a local oscillator 92. The frequency $\omega_o$ of the LO 92 is chosen to match the frequency of the radar signal to be estimated as closely as possible. Similarly, the quadrature baseband component signal is obtained in the output of the mixer 94 which is also fed the signal of frequency $\omega_o$ from the LO 92, but shifted 90° in phase by the phase shifter 96. Upon conversion to baseband the in-phase and quadrature component signals are filtered through low pass filters 98 and 100, respectively, to remove as much noise and interference as possible. Up conversion of the filtered signals from the filters 98 and 100 is achieved in the mixers 102 and 104. The other input to the mixer 102 is the local oscillator 92 reference signal of frequency $\omega_o$ and the input to the mixer 104 is the phase shifted signal from the phase shifter 96. Both the in-phase signal from the mixer 102 and the quadrature component signal from the mixer 104 are summed in the summer 106 and then applied as one input to an AND gate 107.

The output of the low pass filter 98 is also detected by the envelope detector 108 and applied as one of the inputs to another summer 110. The other input to the summer 110 is the signal from an envelope detector 112 which detects the quadrature component of the radar signal. The output of the summer 110 is thus provided as a unipolar videopulse train to an amplitude normalizer 114 of a recognizer 116 wherein it is normalized and introduced to a comb filter 118. The comb filter 118 is tuned to the pulse repetition interval (PRI) of the radar signal to be estimated. The output from the comb filter 118 is simultaneously applied to a pulse width measurer 120 and a threshold device 122. If the pulse width of the radar signal matches the pulse width of the radar signal to be estimated, the measurer provides one of the signals to an AND gate 124. Also if the PRI of the incoming radar signal matches that of the comb filter 118, a threshold signal is generated by the threshold 122 and applied as the other signal to the AND gate 124. Thus, upon simultaneous satisfaction of both pulse width and PRI the gate 124 is actuated, and produces in its output a signal which is applied to a delay circuit 126. The delay circuit 126 provides a delay of one PRI to the output signal of the gate 124 which is then applied as the other input to the AND gate 107.

Thus, upon simultaneous satisfaction of carrier frequency, pulse width, and PRI the gate 107 is actuated by the signal from the delay circuit 126 in time to apply the radar estimate signal from the summer 106 to subtract in the subtractor 12 from the next radar pulse applied to the subtractor 12 at the input terminal 10. Thus, upon actuation of the gate 107, the reconstructed estimate of the radar signal is vectorially subtracted from the input signal in the subtractor 12.

While the invention has been particularly illustrated and described with reference to a preferred embodiment thereof, it will be understood by those skilled in the art that various changes in form and details may be made therein without departing from the spirit and scope of the invention.

We claim:

1. A signal sorting system comprising:

input and output signal terminals;

signal summing means having one input connected to said input terminal and an output connected to said output terminal for subtracting from input signals applied to said input terminal estimate signals applied to the other input of signal summing means to provide error signals at said output terminal;

signal extractor means comprising;

signal generator means for generating a reference signal representing the carrier frequency component of one of said input signals, modulator means comprising a first signal mixer connected to said output terminal and said signal generator means for combining said one error and reference signals to provide the amplitude component signal of said one input signal, and a second signal mixer connected to said first signal mixer, signal generator means and summing means for combining said amplitude component and reference signals to provide said one estimate signal, and said modulator means being connected to said output terminal, signal summing means, and signal generator means for supplying said reference signal with a signal representing the amplitude component of one of said input signals in response to said one error signal to provide one of said estimate signals; and said signal extractor means being connected to said output terminal and said other signal summing means input for providing said estimate signals in response to said error signals.

2. A signal sorting system according to claim 1 wherein said signal extractor means comprises:

a plurality of signal extractors, each of said extractors being responsive to one of said error signals to provide one of said estimate signals.

3. A signal sorting system according to claim 1 wherein said signal generator means comprises:

a phase lock loop connected to said out-put terminal and responsive to said one error signal for generating said reference signal which follows the carrier frequency of said one input signal.

4. A signal sorting system according to claim 1 further comprising:

voltage multiplier means interconnecting said output terminal and said signal generator means, said voltage multiplier means being connected to said first signal mixer and responsive to said amplitude component signal for varying the instantaneous gain of said signal generator means in accordance with said amplitude component signal.

5. A signal sorting system according to claim 4 further comprising:

90° phase shift means interconnecting said phase lock loop and said first and second mixers for shifting the phase of said reference signal 90°.

6. A signal sorting system according to claim 1 wherein said modulator means comprises:

a first signal mixer connected to said output terminal and said signal generator means for combining said one error and reference signals to provide the in-phase amplitude component signal of said one input signal;

a second signal mixer connected to said first signal mixer and said signal generator means for combining said in-phase amplitude component and reference signals to provide an in-phase portion of said one estimate signal;

a 90° phase shifter connected to said signal generator means for shifting the phase of said reference signal 90°;

a third signal mixer connected to said output terminal and said phase shifter for combining said one error and phase shifted reference signals to provide the quadrature amplitude component signal of said one input signal;

a fourth signal mixer connected to said third signal mixer and said phase shifter for combining said quadrature amplitude component and phase shifted reference signals to provide a quadrature portion of said one estimate signal; and a signal summer connected to said second and fourth signal mixers and said signal summing means for combining said in-phase and quadrature portions of said one estimate signal to provide said one estimate signal;

7. A signal sorting system according to claim 6 further comprising:

signal filter means interconnecting said first and second signal mixers, said signal filter means being matched to the signal line rate and intraline correlation of said one input signal.

8. A signal sorting system according to claim 7 further comprising:

a second signal filter means interconnecting said third and fourth signal mixers, said second signal filter means being matched to the signal line rate and intraline correlation of said one input signal.

9. A signal sorting system according to claim 1 wherein said signal generator means comprises:

a local oscillator.

10. A signal sorting system according to claim 1 further comprising:

means interconnecting said modulator means and summing means and responsive to said amplitude component signal for applying said one estimate signal to said summing means to subtract from a succeeding one of said input signals.

11. A signal sorting system according to claim 10 wherein said interconnection means comprises:

envelope detector means connected to said modulator means for detecting the in-phase and quadrature amplitude component signals;

summing means for summing said in-phase and quadrature amplitude component signals;

signal recognizer means connected to said summing means and responsive to said summed in-phase and quadrature amplitude component signals for providing an output signal, said output signal being delayed one signal repetition interval;

gate means interconnecting said signal recognizer means, modulator means, and signal summing means to subtract from a succeeding one of said input signals in response to said output signal.

12. A signal sorting system according to claim 11 wherein said signal recognizer means comprises:

a comb filter connected to said summing means, said comb filter being tuned to the repetition interval of said one input signal for passing said amplitude component signal;

a threshold circuit connected to said comb filter for generating a signal in response to said amplitude component signal;

a signal width measurer connected to said comb filter for generating a signal in response to said amplitude component signal;

an AND gate connected to said threshold circuit and said pulse width measurer for generating said output signal in response to said signals from said threshold circuit and pulse width measurer; and a delay circuit connected to said AND gate and said gate means for delaying application of said output signal to said gate means one signal repetition interval.

13. A frequency modulated signal sorting system comprising:

input and output signal terminals;

signal summing means connected to said input and output terminals for subtracting from a frequency modulated input signal applied to said input terminal an estimate signal to provide an error signal at said output terminal;

a phase lock loop connected to said out-put terminal and responsive to said error signal for generating a reference signal which follows the carrier frequency of said input signal;

a 90° phase shifter connected to said phase lock loop for shifting the phase of said reference signal 90°;

a first signal mixer connected to said output terminal and said phase shifter for combining said error and phase shifted reference signals to provide the amplitude component signal of said input signal;

a second signal mixer connected to said first signal mixer, phase shifter, and summing means for combining said amplitude component and phase shifted reference signals to provide said estimate signal; and a voltage multiplier interconnecting said output terminal and said phase lock loop, said voltage multiplier being connected to said first signal mixer and responsive to said amplitude component signal for varying the instantaneous gain of said phase lock loop in accordance with said amplitude component signal.

14. A television signal sorting system comprising:

input and output signal terminals;

signal summing means connected to said input and output terminals for subtracting from a television input signal applied to said input terminal an estimate signal to provide an error signal at said output terminal;

a phase lock loop connected to said output terminal and responsive to said error signal for generating a reference signal which follows the carrier frequency of said input signal;

a first signal mixer connected to said output terminal and said phase lock loop for combining said error and reference signals to provide the in-phase amplitude component signal of said input signal;

a second signal mixer connected to said first signal mixer and said phase lock loop for combining said inphase amplitude component and reference signals to provide an in-phase portion of said estimate signal;

a 90° phase shifter connected to said phase lock loop for shifting the phase of said reference signal 90°;

a third signal mixer connected to said output terminal and said phase shifter for combining said error and phase shifted reference signals to provide the quadrature amplitude component signal of said input signal;

a fourth signal mixer connected to said third signal mixer and said phase shifter for combining said quadrature amplitude component and phase shifted reference signals to provide a quadrature portion of said estimate signal;

a signal summer connected to said second and fourth signal mixers and said signal summing means for combining said in-phase and quadrature portions of said estimate signal to provide said estimate signal;

a first signal filter means interconnecting said first and second signal mixers, said signal filter means being matched to the signal line rate and intraline correlation of said input signal; and a second signal filter means 1nterconnecting said third and fourth signal mixers, said second signal filter means being matched to the signal line rate and intraline correlation of said input signal.

15. A signal extractor comprising:

a signal generator means, comprising a phase lock loop, for generating a reference signal representing the carrier frequency component of the signal;

modulator means comprising;

first means for combining the signal error with said reference signal to provide the amplitude modulating signal of the signal, and second means for combining said reference and amplitude modulating signals to provide an estimate signal; and said modulator means being connected to said signal generator means for supplying said reference signal with a signal representing the amplitude component of the signal in response to signal error to provide the estimate signal.

16. A signal extractor according to claim 15 further comprising:

voltage multiplier means connected to said signal generator means, said voltage multiplier means being connected to said first signal combining means and responsive to said amplitude component signal for varying the instantaneous gain of said signal generator means in accordance with said amplitude component signal.

17. A signal extractor according to claim 15 further comprising:

90° phase shift means interconnecting said signal generator means and said first signal combining means for shifting phase of said reference signal 90°.

18. A signal extractor according to claim 15 wherein said modulator means comprises:

a first signal mixer connected to said signal generator means for combining error and said reference signals to provide the in-phase amplitude component of the signal;

a second signal mixer connected to said first signal mixer and said signal generator means for combining said in-phase signals to provide an in-phase portion of said estimate signal;

a 90° phase shifter connected to said signal generator means for shifting the phase of said reference signal 90°;

a third signal mixer connected to said phase shifter for combining said error and phase shifted reference signals to provide the quadrature amplitude component of the signal;

a fourth signal mixer connected to said third signal mixer and said phase shifter for combining said quadrature amplitude component and phase shifted reference signals to provide a quadrature portion of said estimate signal; and a signal summer connected to said second and fourth signal mixers for combining said in-phase and quadrature portions of said estimate signal.

19. A signal extractor according to claim 18 further comprising:

first and second filter means interconnecting said first and second and third and fourth signal mixers, respectively, said filter means being matched to the signal line rate and intraline correlation of the signal.

20. A signal extractor according to claim 15 wherein said signal generator means comprises:

a local oscillator.

21. A signal extractor according to claim 15 further comprising:

means connected to said modulator means and responsive to said amplitude component signal for providing said estimate signal.

22. A signal extractor according to claim 21 wherein said connection means comprises:

envelope detector means connected to said modulator means for detecting the in-phase and quadrature portions of said amplitude component signal;

summing means for summing said in-phase and quadrature portions of said amplitude component signal;

signal recognizer means connected to said summing means and responsive to said amplitude component signal for providing an output signal, said output signal being delayed one signal repetition interval; and gate means connected to said signal recognizer means and modulator means for passing said estimate signal in response to said output signal.

23. A signal extractor according to claim 22 wherein said signal recognizer means comprises:

a comb filter connected to said summing means, said comb filter being tuned to the repetition interval of the signal for passing said amplitude component signal;

a threshold circuit connected to said comb filter for generating a signal in response to said amplitude component signal;

a signal with measurer connected to said comb filter for generating a signal in response to said amplitude component signal;

an AND gate connected to said threshold circuit and said pulse width measurer for generating said output signal in response to said signals from said threshold circuit and pulse width measurer; and a delay circuit connected to said AND gate for delaying said output signal one signal repetition interval.

24. A frequency modulated signal extractor comprising:

a phase lock loop responsive to signal error for generating a reference signal which follows the carrier frequency of the signal;

a 90° phase shift connected to said phase lock loop for shifting the phase of said reference signal 90°;

a first signal mixer connected to said phase shifter for combining the error and phase shifted reference signals to provide the amplitude component signal;

a second signal mixer connected to said first signal and phase shifter for combining said amplitude component and phase shifted reference signals to provide an estimate signal; and a voltage multiplier connected to said phase lock loop, said voltage multiplier being connected to said first signal mixer and responsive to said amplitude component signal for varying the instantaneous gain of said phase lock loop in accordance with said amplitude component signal.

25. A television signal extractor comprising:

a phase lock loop responsive to an error television signal for generating a reference signal which follows the carrier frequency of the television signal;

a first signal mixer connected to said phase lock loop for combining said error and reference signals to provide the in-phase amplitude component signal of said television signal;

a second mixer connected to said first signal mixer and said phase lock loop for combining said in-phase amplitude component and reference signals to provide an in-phase portion of an estimate television signal;

a 90° phase shifter connected to said phase lock loop for shifting the phase of said reference signal 90°;

a third signal mixer connected to said phase shifter for combining said error and phase shifted reference signals to provide the quadrature amplitude component signal of said television signal;

a fourth signal mixer connected to said third signal mixer and said phase shifter for combining said quadrature amplitude component and phase shifted reference signals to provide a quadrature portion of said estimate signal;

a signal summer connected to said second and fourth signal mixers for combining said in-phase and quadrature portion of said estimate signal to provide said estimate signal;

a first signal filter means interconnecting said first and second signal mixers, said signal filter means being matched to the signal line rate and intraline correlation of said television signal; and a second signal filter means interconnecting said third and fourth signal mixers, said second signal filter means being matched to the signal line rate and intraline correlation of said television signal.

26. A radar signal sorting system comprising:

input and output signal terminals;

signal summing means connected to said input and output terminals for subtracting from a radar input signal applied to said input terminal an estimate signal to provide an error signal at said output terminal;

a local oscillator for generating a reference signal having a frequency substantially equal to the carrier frequency of said radar signals;

a first signal mixer connected to said local oscillator and said output terminal for combining said radar and reference signals to provide the in-phase amplitude component signal of said radar signal;

a second signal mixer connected to said first signal mixer and said local oscillator for combining said in-phase amplitude component and reference signals to provide an in-phase portion of a radar estimate signal;

a 90° phase shifter connected to said local oscillator for shifting the phase of said reference signal 90°;

a third signal mixer connected to said output terminal and said phase shifter for combining said radar error signal and phase shifted reference signal to provide the quadrature amplitude component signal of said radar signal;

a fourth signal mixer connected to said third signal mixer and said phase shifter for combining said quadrature amplitude component and phase shifter reference signals to provide a quadrature portion of said radar estimate signal;

a signal summer connected to said second and fourth signal mixers for combining said in-phase and quadrature portions of said radar estimate signal to provide said radar estimate signal;

envelope detector means connected to said first and third signal mixers for detecting the in-phase and quadrature amplitude component signal;

summing means connected to said envelope detector means for summing said in-phase and quadrature amplitude component signal;

a comb filter connected to said summing means, said comb filter being tuned to the repetition interval of said radar signal for passing said summed in-phase and quadrature component signal;

a threshold circuit connected to said comb filter for generating a signal in response to said summed in-phase and quadrature component signal;

a signal width measurer connected to said comb filter for generating a signal in response to said summed in-phase and quadrature component signal;

an AND gate connected to said threshold circuit and said pulse width measurer for generating an output signal in response to said signal from said threshold circuit and pulse width measurer;

a delay circuit connected to said AND gate for delaying said output signal one radar repetition interval; and an AND gate connected to said summing means, said signal summer connected to said second and fourth signal mixers, and said delay circuit for passing said radar estimate signal to said summing means to subtract therein from said radar signal in response to said delayed output signal.

27. A radar signal extractor comprising:

a local oscillator for generating a reference signal having a frequency substantially equal to the carrier frequency of the radar signal;

a first signal mixer connected to said local oscillator for combining a radar error signal and said reference signal to provide the in-phase amplitude component signal of said radar signal;

a second signal mixer connected to said first signal mixer and said local oscillator for combining said in-phase amplitude component and reference signals to provide an in-phase portion of a radar estimate signal;

a 90° phase shifter connected to said local oscillator for shifting the phase of said reference signal 90°;

a third signal mixer connected to said phase shifter for combining the radar error and phase shifter reference signals to provide the quadrature amplitude component signal of said radar signal;

a fourth signal mixer connected to said third signal mixer and said phase shifter for combining said quadrature amplitude component and phase shifted reference signals to provide a quadrature portion of said radar estimate signal;

a signal summer connected to said second and fourth signal mixers for combining said in-phase and quadrature portions of said radar estimate signal to provide said radar estimate signal;

a signal summer connected to said second and fourth signal mixers for combining said in-phase and quadrature portions of said radar estimate signal to provide said radar estimate signal;

envelope detector means connected to said first and third signal mixers for detecting the in-phase and quadrature amplitude component signals;

a signal summer connected to said envelope detector means for summing said in-phase and quadrature amplitude component signals;

a comb filter connected to said summing means said comb filter being tuned to the repetition interval of said radar signal for passing said summed in-phase and quadrature component signals;

a threshold circuit connected to said comb filter for generating a signal in response to said summed in-phase and quadrature component signals;

a signal width measurer connected to said comb filter for generating a signal in response to said summed in-phase and quadrature component signals;

an AND gate connected to said threshold circuit and said pulse width measurer for generating an output signal in response to said signals from said threshold circuit and pulse width measurer;

a delay circuit connected to said AND gate for delaying said output signal one radar signal repetition interval; and an AND gate connected to said signal summer and said delay circuit for passing said radar estimate signal in response to said delayed output signal.

28. A system for separating out the signal components from a given signal, wherein said signal includes a plurality of modulated signals in the presence of noise, said system comprising:

means for operating upon each modulated signal component of the given signal to produce an estimate of each such modulated signal component;

means for summing together each of said estimates to produce a first signal;

means for subtracting said first signal from said given signal to produce a second signal; and said second signal driving said means for operating upon each modulated signal component of the given signal.

* * * * *